Patented Dec. 25, 1951

2,580,098

UNITED STATES PATENT OFFICE 2,580,098

PINE WOOD RESIN OF INCREASED MELTING POINT

Reginald W. Ivett, Wilmington, Del., assignor to Hercules Powder Company, Wilmington, Del., a corporation of Delaware No Drawing. Application July 19, 1950, Serial No. 174,790

12 Claims. (Cl. 260—102)

This invention relates to substantially hydrocarbon-insoluble pine wood resins of increased melting point and to a method for their production.

Pine wood resins are frequently used in the pulverized state for the stabilization of soil, as addition agents in mortar and Portland cement, in thermoplastic and thermosetting molding compositions, in asphalt emulsions and oil-resistant coatings, etc. There is a pronounced tendency for such pulverized resins, especially those melting below about 120° C. to coalesce and revert during storage to the resinous state. In the past this tendency toward reversion has been overcome by partially neutralizing the resin with lime or other salt-forming agents to raise the melting point. However, the addition of alkali or alkaline earth metals is objectionable in any applications where both oil and water resistance are desired.

Now in accordance with this invention, it has been found that by contacting pine wood resins containing 30% to 95% petroleum hydrocarbon-insoluble material in the liquid state with gaseous ammonia at a temperature within the range of about 215° C. to about 350° C., a resinous product of increased alkali resistance, of increased melting point, and of less tendency toward sintering and cold flow is produced. To accomplish the results of this invention, the pine wood resin having a substantial petroleum hydrocarbon-insoluble content is contacted at 215° C. to 350° C. with ammonia until the desired increase in melting point is reached. The resulting resin may then be poured into suitable containers or it may be flaked off chilled rolls and stored. The cooled resin may then be pulverized if desired. The embodiments of this invention are more fully illustrated and described by the examples given below. The examples are not to be construed, however, as limitations of the invention, but are to serve only as illustrations of the invention as more fully set forth in the specification and claims. All parts and percentages are by weight unless otherwise indicated.

Example I

Five thousand four hundred eighty parts of a pine wood resin having an acid number 85.7, a melting point 112° C., and gasoline-insoluble content 80% was heated at 300° C. under a steam-heated condenser and sparged with ammonia at the rate of about 170 parts by weight per hour for a period of 10 hours. The condenser allowed water and some volatile oils produced to escape. Samples taken during the course of the reaction had the following analysis:

| Sample | Hours Reacted | Drop Melting Point, ° C. | Acid Number | Per Cent Nitrogen |
|---|---|---|---|---|
| 1 | 2 | 134 | 36.5 | 1.03 |
| 2 | 5 | 134.5 | 17.3 | 1.52 |
| 3 | 7 | 146 | 13.7 | 1.79 |
| 4 | 8.5 | ------ | 12.1 | 1.89 |
| 5 | 10 | 162 | 9.5 | 1.94 |

Example II

One thousand three hundred sixty-six parts pine wood resin having the analyses given below was heated to 280° C. under a steam-heated condenser while sparging with a fine stream of ammonia gas at the rate of 60 parts by weight per hour for 14 hours, a snap sample being taken after 7 hours. The condenser allowed water and some volatile oils produced to escape. The resin (982 parts) was then poured into a container to cool. The analyses of the pine wood resin before and after treatment are given below:

|  | Original Resin | Ammoniated Resin | | |
|---|---|---|---|---|
|  |  | 7 Hrs. | 11.5 Hrs. | 14 Hrs. |
| Acid Number | 83 | 14.3 | 13.6 | 7.1 |
| Melting Point, ° C. (Drop) | 114 | 159 | 173 | 185 |
| Gasoline-Insoluble per cent | 80 | 91.6 | 89 | 91.8 |
| Hydroxyl (Zerewitinoff) do | 5.6 | ------ | 5.0 | ------ |
| Nitrogen do | ------ | 2.1 | 2.0 | 2.1 |

Example III

Five hundred parts gasoline-insoluble pine wood resin of about 65% gasoline-insoluble content and having the analyses given below was heated to 280° C. under a steam-heated condenser while sparging with a fine stream of ammonia gas at the rate of about 20 parts by weight per hour. Snap samples were taken from time to time during a 4-hour reaction period. Analyses are given below:

| Reaction Time (Hrs.) | Melting Point (Drop) ° C. | Acid Number | Per Cent Nitrogen |
|---|---|---|---|
| 0 | 85.0 | 110 | 0.0 |
| 2 | 102.5 | 55.5 | 1.57 |
| 4 | 103.5 | 48.0 | 1.88 |

*Example IV*

Five thousand five hundred ten parts gasoline-insoluble pine wood resin of about 80% gasoline-insoluble content to which was added 13.8 parts zinc oxide was heated to 280° C. and sparged with gaseous ammonia at a rate of 150 parts per hour for 5.5 hours. Analyses of the resin before and after treatment are given below:

| | Original Resin | Treated Resin |
|---|---|---|
| Acid Number | 83 | 21.5 |
| Melting Point (Drop), ° C. | 114 | 150 |
| Per Cent Nitrogen | 0.0 | 1.6 |

The pine wood resin which is used in carrying out this invention may be any portion or substantially all of that dark-colored fraction of pine wood resin which can be extracted from pine wood with aromatic hydrocarbons, alcohols, esters, ketones, etc., and which is characterized by a petroleum hydrocarbon insolubility of from about 30% to about 95%.

The pine wood resin extract, such as is obtained by extracting pine wood with benzene, consists of pale rosin, gasoline-insoluble resinous material, and color bodies. Frequently such extract contains 15% or more of gasoline-insoluble resinous material. Upon the treatment of such resinous extract to separate therefrom a fraction of pale rosin, there is formed one or more fractions containing the balance of the resinous material derived from the pine wood. One or more of such remaining fractions may be used as the resin material in this invention. The nonrosin portion of the pine wood extract may be separated by appropriate processes into a fraction of substantially gasoline-insoluble resinous material and a dark-colored intermediate fraction lying between the substantially gasoline-insoluble fraction and rosin. It is impossible to effect an absolutely clean separation between the gasoline-insoluble resinous material and the rosin. By the preparation of a dark-colored intermediate fraction containing some gasoline-insoluble resinous material and the color bodies, a very good separation of the pine wood extract into rosin, gasoline-insoluble resinous material, and into this intermediate fraction is effected.

As one of the pine wood resins of this invention, it is preferable to use the dark-colored intermediate fraction largely insoluble in petroleum hydrocarbons and obtained by the refining of impure wood rosin to pale grades by means of a selective solvent for color bodies such as furfural, or a selective adsorbent such as fuller's earth. Such an intermediate fraction contains at least 30% and up to about 80% by weight of a gasoline-insoluble resinous material. Still further, the other pine wood resin which may be utilized in this invention is the substantially completely gasoline-insoluble resinous material derived from pine wood and which contains at least about 80% by weight of gasoline-insoluble resinous material. Mixtures of the foregoing resinous materials may also be employed. As an example of such a mixture, a blend of the dark-colored intermediate fraction and the substantially gasoline-insoluble fraction obtained, for example, from pine wood without separation into the individual fractions either by a process which involves leaving the rosin in the wood or by a process which involves separation of the rosin, may be used. The resin material preferably contains at least about 30% of gasoline-insoluble resinous material, varying therefrom up to about 95%.

The dark-colored fraction referred to above is a product resulting from the process used in decolorizing rosin. For example, so-called FF rosin, which is ruby red in color and is derived from pine wood by extraction with benzene followed by evaporation of the benzene and extraction of the resinous residue with a petroleum hydrocarbon, such as hot petroleum ether or hot gasoline, is decolorized by adding furfural to the hot solution, agitating the mixture, and then allowing the mixture to form a liquid layer system in which the furfural layer contains the unsaponifiables and coloring bodies in the original FF rosin and the gasoline layer contains the pale rosin. The furfural layer is separated from the gasoline layer and distilled to recover the furfural, the residue remaining being the dark-colored intermediate fraction referred to. This fraction contains most of the color bodies and a larger proportion of the unsaponifiables from the original FF rosin, as well as a good proportion of the rosin acids. It contains a large proportion of oxidized rosin acids and, therefore, is only partially soluble in petroleum hydrocarbon solvents at room temperature. The percentage of gasoline-insoluble varies from about 30% to about 80% by weight. It has a higher flow point, a much higher viscosity, lower acid number, and a higher unsaponifiable content than FF wood rosin. However, the saponification number is not correspondingly lower, indicating thereby a higher ester content. In addition, it is noncrystallizing. Such a fraction is characterized by the following approximate analysis:

| | |
|---|---|
| Acid number | 105–140 |
| Saponification number | 150–170 |
| Melting point (Hercules Drop Method) °C | 80–115 |
| Unsaponifiable matter per cent | 10–20 |
| Gasoline-insoluble do | 30–80 |
| Petroleum ether-insoluble do | 30–80 |

A typical example of such a fraction had the following analysis: Acid number, 124; saponification number, 150; melting point (Drop), 89° C.; gasoline-insoluble, 57%; unsaponifiable matter, 12%; Lovibond color, dark; and ash content, 0.03%.

The substantially gasoline-insoluble fraction referred to above may be prepared from pine wood by the processes set forth in U. S. patents to Hall, Nos. 2,193,026 and 2,221,540. This fraction is characterized by being substantially completely insoluble in petroleum hydrocarbons, such as gasoline. The gasoline-soluble portion of this fraction rarely exceeds 20% by weight. This fraction may be said to be the gasoline-insoluble resin contained in pine wood. For example, the extraction of pine wood with benzene yields a mixture of this fraction and FF rosin. Upon treatment of the resinous mixture with a mixture of gasoline and a relatively small volume of furfural, the substantially gasoline-insoluble fraction goes into solution in the furfural while the FF' rosin goes into solution in the gasoline. The two layers are allowed to separate, and the resinous materials then may be recovered from the separated layers in any suitable manner, for example, by distilling off the volatiles.

The substantially completely gasoline-insoluble fraction is, in general, defined by the following characteristics: Substantial insolubility in petroleum hydrocarbons, the insolubility being of the order of at least 80%, substantially complete solubility in alcohol, a methoxy content of from about 3% to about 7%, an acid number of from about 80 to about 110, a melting point by the Hercules Drop Method of from about 95° C. to about 125° C., a saponification number of from about 135 to about 145, and a noncarboxylic hydroxyl content of from about 5% to about 9%. A typical specimen had the following characteristics: Drop melting point, 115° C.; acid number, 93; gasoline-insoluble matter, 88%; toluene-insoluble matter, 80%; saponification number, 140; and ash content, 0.02%.

In general, the pine wood resins employed in carrying out the present invention and which are typified by the dark-colored intermediate fraction of color bodies referred to at length above and the substantially completely gasoline-insoluble fraction and blends thereof may be defined as the resins naturally occurring in pine wood and characterized by a gasoline insolubility of about 30% to about 95%, an unsaponifiable content of from about 5% to about 20%, a melting point above 85° C. and preferably about 90° C., and an acid number of not over about 140.

The resinous composition produced by the process of this invention is a hard, friable, high melting resin which is black in color by reflected light but dark red when viewed by transmitting light through a thin film and gives a dark brown powder when crushed. Visually, by reflected light it differs slightly or not at all from the pine wood resin from which it is produced. By transmitted light, it is much darker than the resin from which it is produced. It differs chiefly in having a higher melting point than the original resin and in containing at least about 1% combined trivalent nitrogen. It will have a lower petroleum hydrocarbon-insoluble content but a slightly higher molecular weight and a lower acid number than the original pine wood resin from which it is made. Chemically, the petroleum hydrocarbon-insoluble pine wood resin product appears to have combined therewith trivalent nitrogen which is largely hydrolyzable under drastic saponification conditions. The Zerewitinoff value for active hydrogen, corrected for carboxylic acid groups, is substantially the same as that of the untreated resin. The nitrogen thus appears to have combined largely in the form of nitrile groups. Amides would increase the active hydrogen analysis. Since nitriles are generally lower melting than the corresponding acids, rosin nitriles, for instance, being balsams as compared with rosin which is vitreous, it was surprising that the petroleum hydrocarbon-insoluble pine wood resin should by chemical combination with ammonia become more vitreous and higher melting under nitrile-forming conditions. The ammonia is not combined simply as the salt for it is not liberated by cold saponification and the product is more alkali-resistant than would be the case if the product were simply an ammonium salt. Moreover, all of the nitrogen in the product is not liberated by drastic saponification and appears to be combined in part as amino nitrogen, as amino groups, or as derivatives of aldehydes or ketones or as constituents of heterocyclic rings. The nitrogen is best described as being combined trivalent nitrogen as distinguished from pentavalent nitrogen such as is the case in ammonium salts. It could similarly be classified as nonionic to distinguish from ionic nitrogen such as the nitrogen as it occurs in ammonium salts. Since the pine wood resin is a complex mixture having many types of functional groups, the nitrogen is undoubtedly present in the products, not only in the form of nitrile groups but at least in part as amide, imide, and amino nitrogen of the types indicated above.

These treated pine wood resins will be tack-free and will have melting points as much as 40° C. to 100° C. higher than the resins from which they are produced, and they will have gasoline-insoluble contents higher or substantially the same as the original pine wood resins. The treated resins thus are capable of being pulverized to powder of little or no tendency to revert to agglomerates or resinous masses. In order to be entirely free from any tendency to revert under normal storage conditions the resin should have a melting point above about 110° C. However, a melting point about 120° C. is desired as a safety factor against particularly disadvantageous storage conditions for the pulverized material.

The temperature at which the ammoniation of the pine wood resin is carried out in accordance with this invention will vary with the type of pine wood resin used, the degree of dispersion of the gas, the pressure and the presence of catalysts, etc. Temperatures as low as 215° C. and as high as 350° C. may be used when proper conditions are chosen. The preferred temperature range is about 290° C.±10° C. At the lower temperatures it may be desirable to use dehydration catalysts to hasten the completion of the ammoniation. At higher temperatures the reaction may be completed in a conveniently short time without the use of catalysts.

The treatment with ammonia may be carried out at atmospheric pressure or elevated or reduced pressure. Since water is evolved in the condensation, provision for its removal must be made. This is conveniently accomplished by driving off the water with the ammonia. The ammonia is preferably recovered from the water and recirculated. The recirculation of ammonia with removal of water is equally well accomplished regardless of the pressure.

The time of contact of the resin with the gaseous ammonia will vary according to the method of treatment, the presence of catalysts, the temperature, etc. The desired increase in melting point is ordinarily reached by the time the product contains about 1% combined trivalent nitrogen. This time may vary from 1 to 2 hours. To reach the maximum in melting point, several hours will be required. A maximum of about 2% nitrogen will be attained by continuing the reaction for several hours. By continued heating and sparging after the nitrogen content has reached 2%, the melting point may be increased still further. Similarly continued heating after 1% nitrogen is introduced will increase the melting point of the resin by subsequent condensation without further increase in nitrogen. The products containing 1-2% nitrogen, while possibly not differing greatly in melting point among themselves, will differ in acid number, alkali resistance, and related characteristics, even though superior to the untreated nitrogen-free resins. The time of reaction is thus best designated in terms of nitrogen combined and the minimum time is that required for at least about 1% combined trivalent nitrogen to be introduced into the product. Products so characterized will all be of increased melting point.

The ammoniation rate may be suitably accelerated by adding catalysts such as resin salts, oxides or hydroxides of such metals as zinc, calcium, or aluminum. Zinc salts or zinc oxide which reacts with the pine wood resin to form a salt is a preferred catalyst. In general, if a soluble catalyst is used, it is preferably left in the product. However, if insoluble catalysts such as alumina, silica gel, and the like are used in the form of lumps or pellets, they may be removed by centrifuging or filtering. The useful catalysts are those known to be useful for the condensation of the carboxyl group with ammonia to form a nitrile. The amount of catalyst will vary from none at all to about 5% of the pine wood resin used but about 1% is considered satisfactory.

The conditions for increasing the melting point of the petroleum hydrocarbon-insoluble pine wood resin by treatment with ammonia at about 215-350° C. are seen from the above description to be essentially the conditions for the conversion of carboxyl-containing acidic compounds to nitriles by the reaction of converting the carboxyl group to nitrile groups. In view of the decrease in acid number, nitrile formation as stated above apparently takes place in part. The petroleum hydrocarbon-insoluble pine wood resin of increased melting point and containing at least about 1% combined trivalent nitrogen is not more viscous or tacky like nitriles of similar acidic materials but is more vitreous, less tacky, and has less tendency to cake in the powdered state. Due to increased resistance to alkali the products find utility in floor tiles, molding plastics for storage battery separators and cases, and the like.

What I claim and desire to protect by Letters Patent is:

1. A method of increasing the melting point of a pine wood resin having a petroleum hydrocarbon-insoluble content of 30% to 95% which comprises contacting said pine wood resin at a temperature within the range of about 215° C. to about 350° C. with gaseous ammonia until the product contains at least about 1% combined trivalent nitrogen.

2. A method of increasing the melting point of a pine wood resin having a petroleum hydrocarbon-insoluble content of 30% to 80% which comprises contacting said pine wood resin at a temperature within the range of about 215° C. to about 350° C. with gaseous ammonia until the product contains at least about 1% combined trivalent nitrogen.

3. A method of increasing the melting point of a pine wood resin having a petroleum hydrocarbon-insoluble content of 30% to 80% which comprises contacting said pine wood resin in the presence of a catalyst for the condensation of a carboxyl group with ammonia to form a nitrile at a temperature within the range of about 215° C. to about 350° C. with gaseous ammonia until the product contains at least about 1% trivalent nitrogen.

4. A method of increasing the melting point of a pine wood resin having a petroleum hydrocarbon-insoluble content of 30% to 95% which comprises contacting said pine wood resin in the presence of a catalyst for the condensation of a carboxyl group with ammonia to form a nitrile at a temperature within the range of about 215° C. to about 350° C. with gaseous ammonia until the product contains at least about 1% combined trivalent nitrogen.

5. A method of increasing the melting point of a pine wood resin having a petroleum hydrocarbon-insoluble content of 30% to 95% which comprises contacting said pine wood resin in the presence of a catalyst of the group consisting of oxides, hydroxides, and salts of zinc at a temperature within the range of about 215° C. to about 350° C. with gaseous ammonia until the product contains at least about 1% combined trivalent nitrogen.

6. A method of increasing the melting point of a pine wood resin having a petroleum hydrocarbon-insoluble content of 30% to 80% which comprises contacting said pine wood resin in the presence of a catalyst of the group consisting of oxides, hydroxides, and salts of zinc at a temperature within the range of about 215° C. to about 350° C. with gaseous ammonia until the product contains at least about 1% combined trivalent nitrogen.

7. A method of increasing the melting point of a pine wood resin having a petroleum hydrocarbon-insoluble content of 80% to 95% which comprises contacting said pine wood resin at a temperature within the range of about 215° C. to about 350° C. with gaseous ammonia until the product contains at least about 1% combined trivalent nitrogen.

8. A method of increasing the melting point of a pine wood resin having a petroleum hydrocarbon-insoluble content of 80% to 95% which comprises contacting said pine wood resin in the presence of a catalyst for the condensation of a carboxyl group with ammonia to form a nitrile at a temperature within the range of about 215° C. to about 350° C. with gaseous ammonia until the product contains at least about 1% trivalent nitrogen.

9. A method of increasing the melting point of a pine wood resin having a petroleum hydrocarbon-insoluble content of 80% to 95% which comprises contacting said pine wood resin in the presence of a catalyst of the group consisting of oxides, hydroxides, and salts of zinc at a temperature within the range of about 215° C. to about 350° C. with gaseous ammonia until the product contains at least about 1% combined trivalent nitrogen.

10. A modified pine wood resin produced by reacting a pine wood resin containing from about 30% to about 95% petroleum hydrocarbon-insoluble material with ammonia under nitrile-forming conditions at a temperature within the range of about 215° C. to about 350° C. until the product contains at least about 1% combined trivalent nitrogen.

11. A modified pine wood resin produced by reacting a pine wood resin extract separated from wood rosin as the colored fraction in refining of FF wood rosin to pale wood rosin and containing from about 30% to about 80% petroleum hydrocarbon-insoluble material with ammonia under nitrile-forming conditions at a temperature within the range of about 215° C. to about 350° C. until the product contains at least about 1% combined trivalent nitrogen.

12. A modified pine wood resin produced by reacting a pine wood resin extract separated from the aromatic hydrocarbon-soluble portion of pine wood by precipitation with a petroleum hydrocarbon and containing from about 80% to about 95% petroleum hydrocarbon-insoluble material with ammonia under nitrile-forming conditions at a temperature within the range of about 215° C. to about 350° C. until the product contains at least about 1% combined trivalent nitrogen.

REGINALD W. IVETT.

REFERENCES CITED

The following references are of record in the file of this patent:

UNITED STATES PATENTS

| Number | Name | Date |
|---|---|---|
| 2,023,337 | Nicodemus | Dec. 3, 1935 |
| 2,193,026 | Hall | Mar. 12, 1940 |
| 2,242,289 | DeLaney | May 20, 1941 |
| 2,511,603 | Spurlin | June 13, 1950 |